United States Patent [19]

Blumenthal et al.

[11] Patent Number: 5,711,547
[45] Date of Patent: Jan. 27, 1998

[54] PRESSURE VESSEL WITH TWO-PART CLOSURE STRUCTURE

[75] Inventors: Jack L. Blumenthal, Los Angeles, Calif.; Paul T. Saccone, Rochester Hills, Mich.

[73] Assignee: TRW Vehicle Safety Systems Inc., Lyndhurst, Ohio

[21] Appl. No.: 629,350

[22] Filed: Apr. 8, 1996

[51] Int. Cl.[6] ............................................ B60R 21/26
[52] U.S. Cl. ............................ 280/737; 280/741; 222/5
[58] Field of Search .......................... 280/736, 737, 280/740, 741, 742; 222/3, 5

[56] References Cited

U.S. PATENT DOCUMENTS

| | | |
|---|---|---|
| 3,567,245 | 3/1971 | Ekstrom . |
| 4,006,919 | 2/1977 | Neuman . |
| 4,530,516 | 7/1985 | Adams et al. ........................ 280/741 |
| 5,253,895 | 10/1993 | Bretfeld et al. ..................... 280/736 |
| 5,344,186 | 9/1994 | Bergerson et al. . |
| 5,348,344 | 9/1994 | Blumenthal et al. . |
| 5,350,192 | 9/1994 | Blumenthal . |
| 5,419,578 | 5/1995 | Storey et al. ...................... 280/741 |
| 5,464,247 | 11/1995 | Rizzi et al. . |

OTHER PUBLICATIONS

W. G. Fassnacht, et al., ASM Committee on Flash, Friction and Stud Welding, Friction Welding, Metals Handbook, eighth edition, vol. 6, Welding and Brazing, 1971, pp. 485 and 507–518, American Society for Metals, Metals Park, Ohio 44073.

Primary Examiner—Paul N. Dickson

[57] ABSTRACT

A tank closure (14) has first and second parts (60,62) which are friction welded to each other. The first part (60) of the tank closure (14) is formed of steel, and includes a rupturable closure wall (20). The second part (62) of the tank closure (14) is formed of aluminum or an aluminum alloy, and has a fluid flow conduit (64) communicating the closure wall (20) with an outlet opening (22).

38 Claims, 6 Drawing Sheets

5,711,547

PRESSURE VESSEL WITH TWO-PART CLOSURE STRUCTURE

FIELD OF THE INVENTION

The present invention relates to a pressure vessel for containing fluid under pressure, and particularly relates to a closure structure for a pressure vessel.

BACKGROUND OF THE INVENTION

A pressure vessel may include a tank and a closure structure with a rupturable closure wall. In such a pressure vessel, the closure structure is fixed and sealed to an outlet portion of the tank to close the tank. The closure structure is typically constructed as an outlet manifold with a fluid flow conduit extending from the closure wall to a plurality of outlet openings. The closure wall blocks fluid in the tank from flowing outward into the conduit.

When the fluid in the tank is to be released from the pressure vessel, the closure wall is ruptured. As known in the art, the closure wall may be ruptured by fluid pressure forces acting outward against the closure wall, and/or by the impact of a piston or the like. The fluid then flows outward past the ruptured closure wall and into the conduit, and further outward through the conduit and the outlet openings.

SUMMARY OF THE INVENTION

In accordance with the present invention, a tank closure has first and second parts which are friction welded to each other. The first part of the tank closure is formed of steel, and includes a rupturable closure wall. The second part of the tank closure is formed of material which is comprised at least substantially of aluminum, and defines a fluid flow conduit communicating the closure wall with an outlet opening.

A tank closure constructed in accordance with the present invention is formed of dissimilar materials that are desirable for the corresponding parts of the tank closure. The first part of the tank closure, which includes the rupturable closure wall, is formed of steel to resist creep under the influence of elevated fluid pressures acting outward against the closure wall. The second part of the tank closure, which defines the conduit, is formed of aluminum or an aluminum alloy so that its weight and cost are less than if it were formed of steel. Additionally, the second part of the tank closure can be friction welded to an aluminum tank more easily than if it were made of steel.

In the preferred embodiments of the present invention, the tank closure is used to close a tank containing combustible fluid. An initiator assembly, when actuated, ignites the fluid. The steel material of the first part of the tank closure resists oxidation under the influence of heat generated by combustion of the fluid in the tank. The second part of the tank closure is preferably anodized for increased resistance to oxidation under the influence of the heated fluid flowing outward through the conduit.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
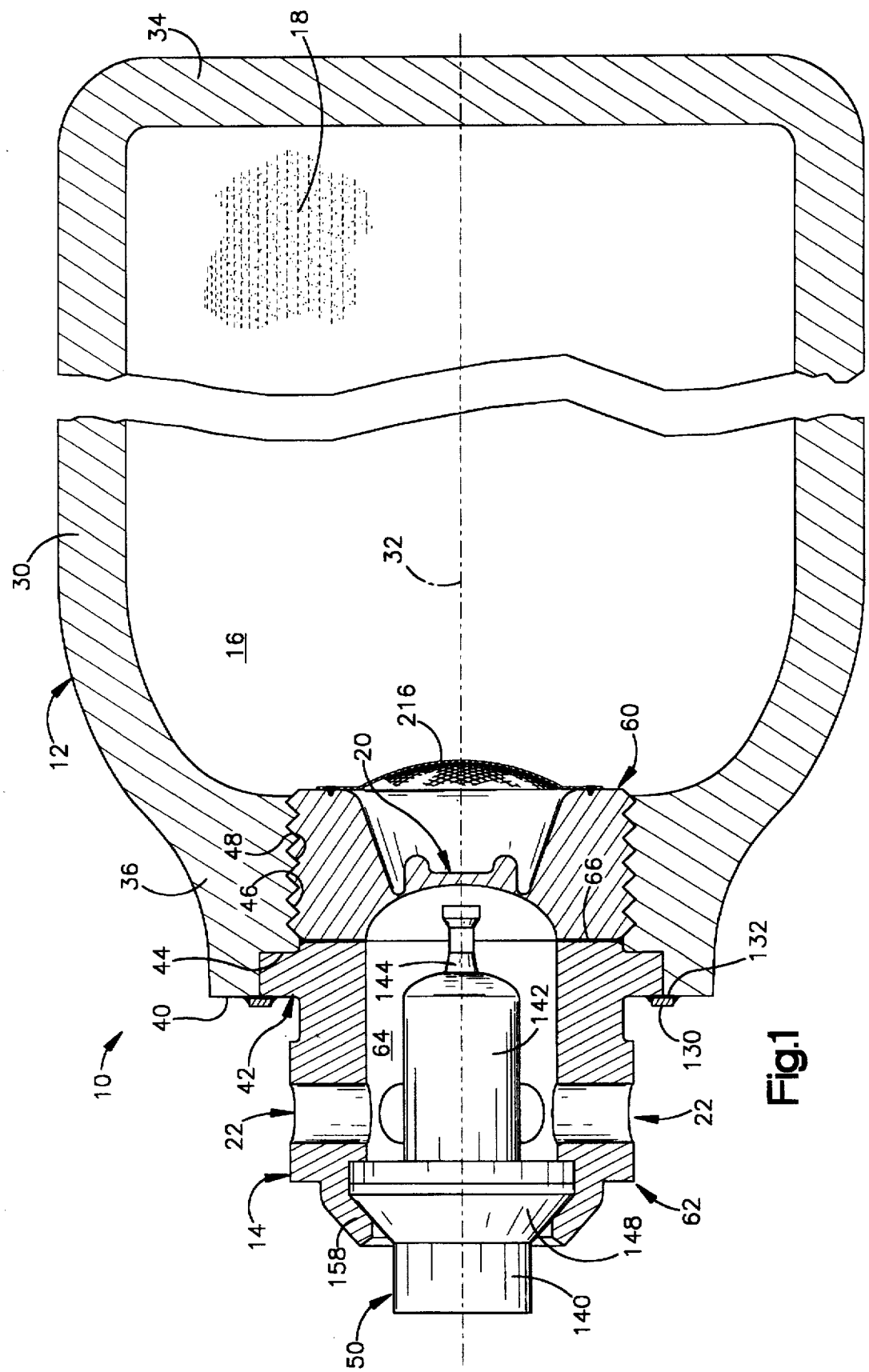
FIG. 1 is a view of a pressure vessel comprising a first embodiment of the present invention.

A pressure vessel 10 comprising a first embodiment of the present invention is shown in FIG. 1. The pressure vessel 10 includes a tank 12, which is sometimes referred to as a bottle, and a closure structure 14 which closes the tank 12. The tank 12 has a storage chamber 16 containing fluid 18 under pressure. In the first embodiment of the present invention, the closure structure 14 is a plug with a rupturable closure wall 20. The closure wall 20 is exposed to the pressure in the storage chamber 16, and blocks the fluid 18 from flowing out of the storage chamber 16. When the pressure vessel 10 is opened, the closure wall 20 is ruptured and the fluid 18 is released to flow out of the storage chamber 16 past the closure wall 20. The fluid 18 then flows outward through the plug 14 and further outward from the pressure vessel 10 through a plurality of outlet openings 22 in the plug 14.

As an example of a tank that can be closed in accordance with the present invention, the tank 12 shown in the drawings has an elongated cylindrical body wall 30 with a longitudinal central axis 32. The tank 12 further has a circular end wall 34 at one end of the body wall 30 and a tapered, tubular neck 36 at the opposite end of the body wall 30.

An annular end surface 40 of the neck 36 defines a circular tank opening 42 which is centered on the axis 32. An annular inner shoulder surface 44 of the neck 36 is concentric with, and recessed axially from, the end surface 40. A cylindrical inner surface 46 of the neck 36 also is centered on the axis 32. The cylindrical inner surface 46 extends axially inward from the shoulder surface 44 to the storage chamber 16, and defines an internal screw thread 48. The tank 12 is preferably formed of a material which is comprised at least substantially of aluminum, i.e., aluminum or an aluminum alloy, for low weight and cost. For example, 6061 Alloy is especially suitable for the tank 12.

The fluid 18 contained under pressure in the storage chamber 16 may comprise, for example, inflation fluid for inflating an inflatable device. In the preferred embodiments of the present invention, the fluid 18 comprises inflation fluid for inflating a particular type of inflatable vehicle occupant protection device (not shown) which is commonly referred to as an air bag. Specifically, the inflation fluid 18 comprises combustible fluid. The combustible fluid may have any suitable composition known in the art, but most preferably comprises a combustible mixture of gases including a fuel gas, an oxidizer gas, and an inert gas in accordance with the invention set forth in U.S. Pat. No. 5,348,344, assigned to TRW Vehicle Safety Systems Inc. The combustible mixture of gases 18 is preferably contained in the storage chamber 16 at a storage pressure within the range of approximately 1500 psi to approximately 5000 psi.

The plug 14 has a generally cylindrical shape, and is received coaxially within the tank opening 42 to close the tank 12. Additionally, the plug 14 supports an initiator assembly 50 in a position centered on the axis 32 of the tank 12. As described fully below, the initiator assembly 50 functions to open the pressure vessel 10 to initiate a pressurized flow of the combustible mixture of gases 18 from the storage chamber 16. The initiator assembly 50 also functions to ignite the combustible mixture of gases 18 in the storage chamber 16. As a result, the fluid pressure inside the storage chamber 16, and hence the flow rate outward from the storage chamber 16, is increased by heat generated upon combustion of the mixture of gases 18.

As shown in FIG. 1, the plug 14 has first and second parts 60 and 62. The first plug part 60 includes the closure wall 20, and is preferably formed of steel for higher resistance to creep under stress induced in the closure wall 20 by the fluid pressure in the storage chamber 16. Additionally, the first plug part 60 is most preferably formed of stainless steel for higher resistance to melting and oxidation under the influence of the heat generated by combustion of the mixture of gases 18. For example, Type 304L and Type 316L stainless steel are especially suitable for the first plug part 60.

The second plug part 62 is constructed as an outlet manifold with a fluid flow conduit 64 communicating the closure wall 20 with the outlet openings 22. Like the tank 12, the second plug part 62 is preferably formed of material which is comprised at least substantially of aluminum, with 6061 Alloy being most preferable. The second plug part 62 is thus lighter and less costly than if it were formed of steel. A friction weld 66 fixes and seals the first and second plug parts 60 and 62 to each other. The friction weld 66 preferably is an inertia weld. However, another type of friction weld, such as a conventional friction weld or a flywheel friction weld, can be used as an alternative.

Figure 2:
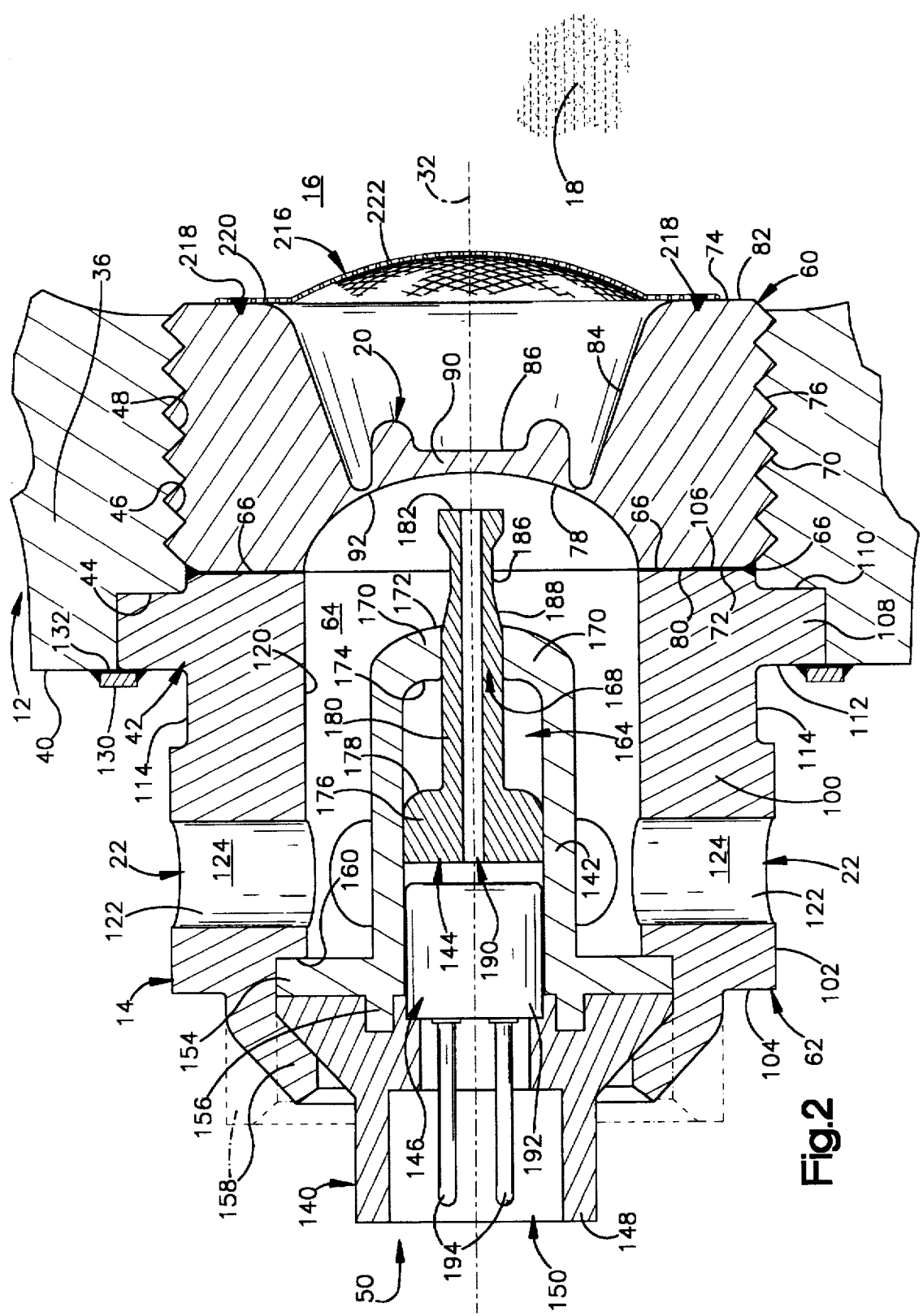
FIG. 2 is an enlarged partial view of the pressure vessel of FIG. 1.

As shown in the enlarged view of FIG. 2, the first plug part 60 has a cylindrical peripheral surface 70, an outer end surface 72, and an inner end surface 74. The peripheral surface 70 defines an external screw thread 76 which engages the internal screw thread 48 on the neck 36 of the bottle 12. The outer end surface 72 has a concave, circular central portion 78 extending diametrically across the axis 32. The outer end surface 72 further has a planar, annular peripheral portion 80. The peripheral portion 80 is perpendicular to the axis 32, and extends radially outward from the central portion 78 to the screw thread 76. The first plug part 60 thus has a short cylindrical shape that does not project axially outward beyond the concave central surface portion 78. This structural feature helps to minimize the length of the first plug part 60 so that the weight and cost of the steel are minimized accordingly.

The inner end surface 74 of the first plug part 60 similarly has a planar, annular peripheral portion 82 perpendicular to the axis 32. The inner end surface 74 further has a frustoconical intermediate portion 84 which is tapered radially inward from the peripheral portion 82. A central portion 86 of the inner end surface 74 is bounded by the intermediate portion 84, and also extends across the axis 32. The closure wall 20 is defined by the material of the first plug part 60 which is located axially between the central portions 78 and 86 of the inner and outer end surfaces 72 and 74. Accordingly, the first plug part 60, with the closure wall 20, in the first embodiment of the present invention is a single continuous body of material (stainless steel).

More specifically, the closure wall 20 extends diametrically across the axis 32 at the center of the first plug part 60, and has a disk-shaped central portion 90 bounded by a thin, annular peripheral portion 92. The peripheral portion 92 of the closure wall 20 is constructed as a stress riser which is rupturable under the influence Of a predetermined elevated fluid pressure acting outward against the closure wall 20 from the storage chamber 16. The central portion 90 of the closure wall 20 is thus constructed as a predefined breakaway part which becomes severed from the peripheral portion 92 upon rupturing of the peripheral portion 92.

The second plug part 62 in the first embodiment of the present invention also is a single continuous body of material (aluminum or an aluminum alloy). With further reference to FIG. 2, the second plug part 62 has a tubular body portion 100 with a cylindrical outer surface 102 centered on the axis 32. The body portion 100 of the second plug part 62 further has an annular outer end surface 104 and an annular inner end surface 106, each of which is planar and perpendicular to the axis 32. The inner end surface 106 of the second plug part 62 abuts the outer end surface 72 of the first plug part 60 at the peripheral portion 80 of the outer end surface 72.

A ring-shaped flange 108 projects radially outward from the body portion 100 of the second plug part 62 at a location spaced a short distance axially from the inner end surface 106. The flange 108 has annular inner and outer side surfaces 110 and 112 which are planar and perpendicular to the axis 32. A plurality of planar outer surfaces 114, two of which are shown in the sectional view of FIG. 2, define a corresponding plurality of wrench flats on the body portion 100 of the second plug part 62 adjacent to the flange 108. Although the wrench flats 114 are located on the second plug part 62, the second plug part 62 is free of an external screw thread like the external screw thread 76 on the first plug part 60.

The second plug part 62 further has a major cylindrical inner surface 120 and a plurality of minor cylindrical inner surfaces 122. The major cylindrical inner surface 120 is centered on the axis 32, and defines the conduit 64. The minor cylindrical inner surfaces 122 extend radially outward from the major cylindrical inner surface 120, and define a corresponding plurality of outlet passages 124 which communicate the conduit 64 with the outlet openings 22. Preferably, the cylindrical inner surfaces 120 and 122 are anodized for increased resistance to oxidation under the influence of the heat generated by combustion of the combustible mixture of gases 18. The cylindrical outer surface 102 also may be anodized for increased resistance to oxidation around the outlet openings 22.

As noted above, the first and second plug parts 60 and 62 are fixed and sealed to each other by the inertia weld 66. The inertia weld 66 joins the inner end surface 106 of the second plug part 62 to the outer end surface 72 of the first plug part 60. The first and second plug parts 60 and 62 are interconnected in this manner before the plug 14 is installed in the neck 36 of the tank 12. Accordingly, the plug 14 is installed in the neck 36 of the tank 12 by screwing the first plug part 60 into the neck 36 until the flange 108 on the second plug part 62 moves axially against the neck 36. The inner side surface 110 of the flange 108 then abuts the shoulder surface 44 in the neck 36.

When the plug 14 has been moved fully into the neck 36 of the tank 12 in the foregoing manner, the outer side surface 112 of the flange 108 adjoins, and is coplanar with, the end surface 40 of the neck 36. The plug 14 is then connected to the neck 36 by a weld ring 130. The weld ring 130 overlies both of the adjoining, coplanar surfaces 112 and 40 so as to extend radially across the juncture of those surfaces circumferentially entirely around the axis 32. A friction weld 132 is formed where the weld ring 130 overlies the adjoining surfaces 112 and 40 so that the plug 14 is fixed and sealed to the neck 36 of the tank 12 entirely around the axis 32. Like the weld 66 described above, the friction weld 132 preferably is an inertia weld.

The plug 14 may further include an inlet structure (not shown) for filling the tank 12 with the combustible mixture of gases 18, or other fluid, to be contained under pressure in the storage chamber 16. As known in the art, such an inlet structure may comprise a check valve in an inlet passage extending through the plug 14.

The fluid pressure in the storage chamber 16 urges the plug 14 to move axially outward from the neck 36 of the tank 12. This induces stress in the inertia weld 132, with such stress consisting essentially of tensile and shear stress. Therefore, the weld ring 130 is preferably formed of material which is comprised at least substantially of aluminum so that the weld ring 130, the neck 36, and the second plug part 62 are formed of similar materials. This helps to maximize the strength of the inertia weld 132. Moreover, the fluid pressure in the storage chamber 16 presses the first and second plug parts 60 and 62 axially against each other. The stress induced in the corresponding inertia weld 66 thus consists essentially of compressive stress. The dissimilar materials (steel and aluminum or an aluminum alloy) of the first and second plug parts 60 and 62 are securely fixed and sealed to each other by the inertia weld 66 in this condition.

As shown in FIG. 1, the initiator assembly 50 has an elongated, two-part housing 140 extending longitudinally along the axis 32 of the tank 12. As shown in FIG. 2, one part 142 of the housing 140 is a tubular cylinder 142. The cylinder 142 contains a probe 144 and an electrically actuatable initiator 146. The other part 148 of the housing 140 is an adapter with a socket 150 for connection of the initiator 146 in an electrical circuit 152 (FIG. 3) in a vehicle. The adapter 148 is shaped to mate with radially and axially projecting flanges 154 and 156 on the cylinder 142. A tubular outer end wall 158 of the second plug part 62 is crimped radially and axially inward against the adapter 148. The outer end wall 158 presses the flange 154 on the cylinder 142 firmly against an annular inner shoulder surface 160 of the second plug part 62.

Figure 4:
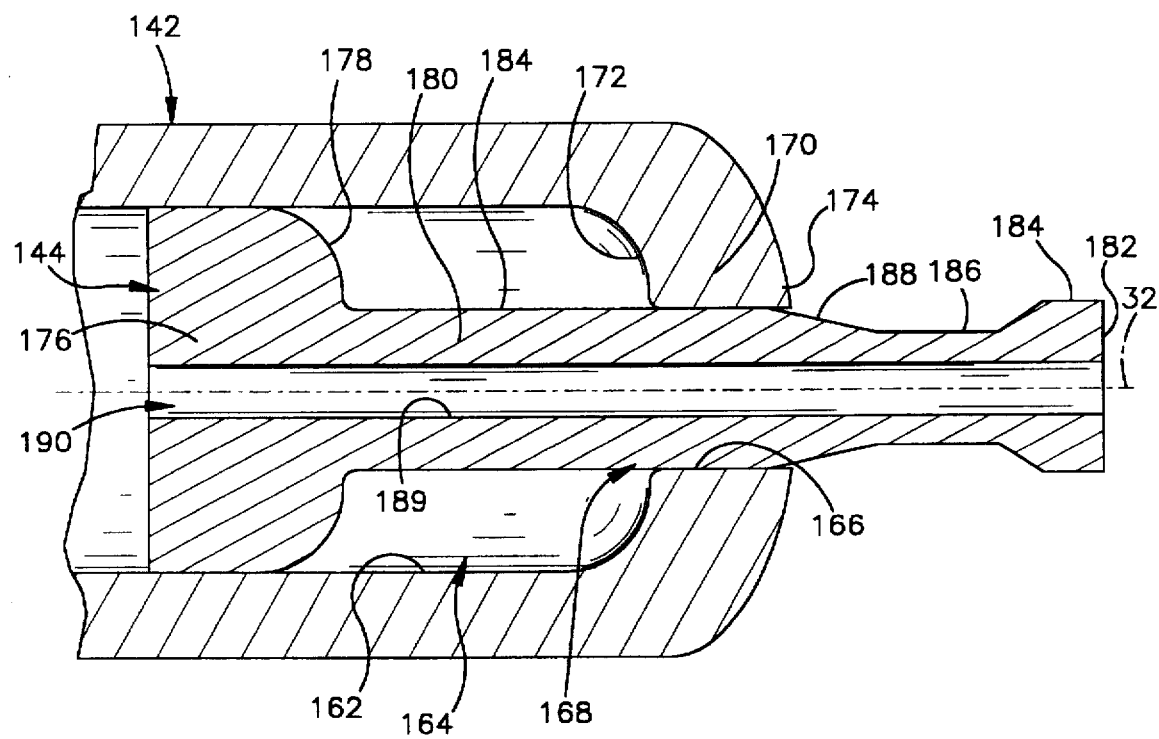
FIG. 4 is an enlarged partial view of parts shown in FIG. 2.

As shown partially in greater detail in FIG. 4, the cylinder 142 has a first cylindrical inner surface 162 defining a first bore 164. The first bore 164 is centered on the axis 32, and extends throughout the interior length of the cylinder. A second cylindrical inner surface 166 of the cylinder 142 defines a second, reduced diameter bore 168. The second bore 168 also is centered on the axis 32, and extends axially through an end wall 170 of the cylinder 142. An annular inner side surface 172 of the end wall 170 preferably has a concave contour. An oppositely facing, annular outer side surface 174 of the end wall 170 preferably has a convex contour.

The probe 144 has a short cylindrical base 176 received closely within the first bore 164 for sliding movement along the axis 32. An annular outer side surface 178 of the base 176 faces axially toward the inner side surface 172 of the end wall 170. The outer side surface 178 preferably has a convex contour.

The probe 144 further has a shaft 180 projecting axially from the base 176. The shaft 180 is received closely through the second bore 168, and has an annular end surface 182 in a plane perpendicular to the axis 32. A cylindrical peripheral surface 184 of the shaft 180 extends axially from the base 176 to the end surface 182. The peripheral surface 184 has a reduced diameter portion 186 which is spaced a short distance axially from the end surface 182. A tapered portion 188 of the peripheral surface 184 extends radially outward from the reduced diameter portion 186. A cylindrical inner surface 189 of the probe 144 defines a cylindrical passage 190 extending entirely through the probe 144 along the axis 32.

Referring again to FIG. 2, the initiator 146 has a cylindrical casing 192 containing a charge of pyrotechnic material. The pyrotechnic material may have any suitable composition known in the art, and is ignited in a known manner upon the passage of electric current through the initiator 146 between a pair of electrodes 194. The casing 192 fits closely within the first bore 162 in the cylinder 142, and is held in place by the adapter 148. The electrodes 194 project axially from the casing 192 and extend into the socket 150 in the adapter 148.

Figure 3:
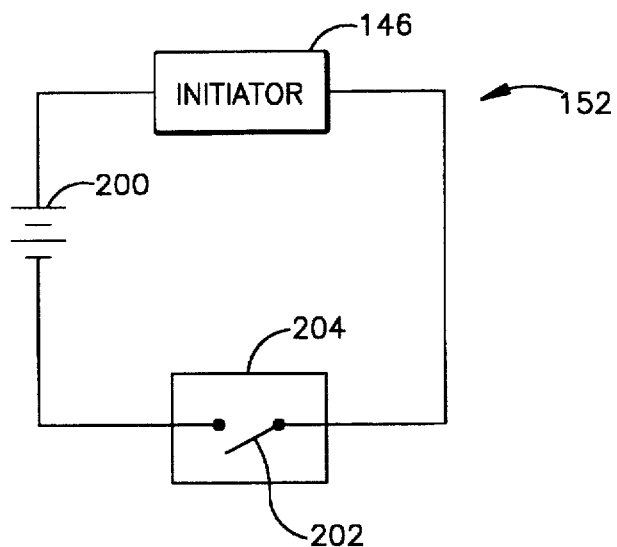
FIG. 3 is a schematic view of an electrical circuit including a part of the pressure vessel of FIG. 1.

As shown schematically in FIG. 3, the initiator 146 is connected in the electrical circuit 152 with a power source 200 and a normally open switch 202. The power source 200 is preferably the vehicle battery and/or a capacitor. The switch 202 is part of a collision sensor 204 which senses a vehicle condition indicating the occurrence of a collision. The collision-indicting condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag is desired to help protect an occupant of the vehicle.

When the collision sensor 204 senses a collision-indicating condition at or above the predetermined threshold level, the switch 202 closes and electric current is directed through the initiator 146 between the electrodes 194. The pyrotechnic material in the casing 192 is then ignited and produces combustion products including heat, hot particles, and hot gases. The combustion products are spewed from the casing 192 into the first bore 164 adjacent to the base 176 of the probe 144.

Figure 5:
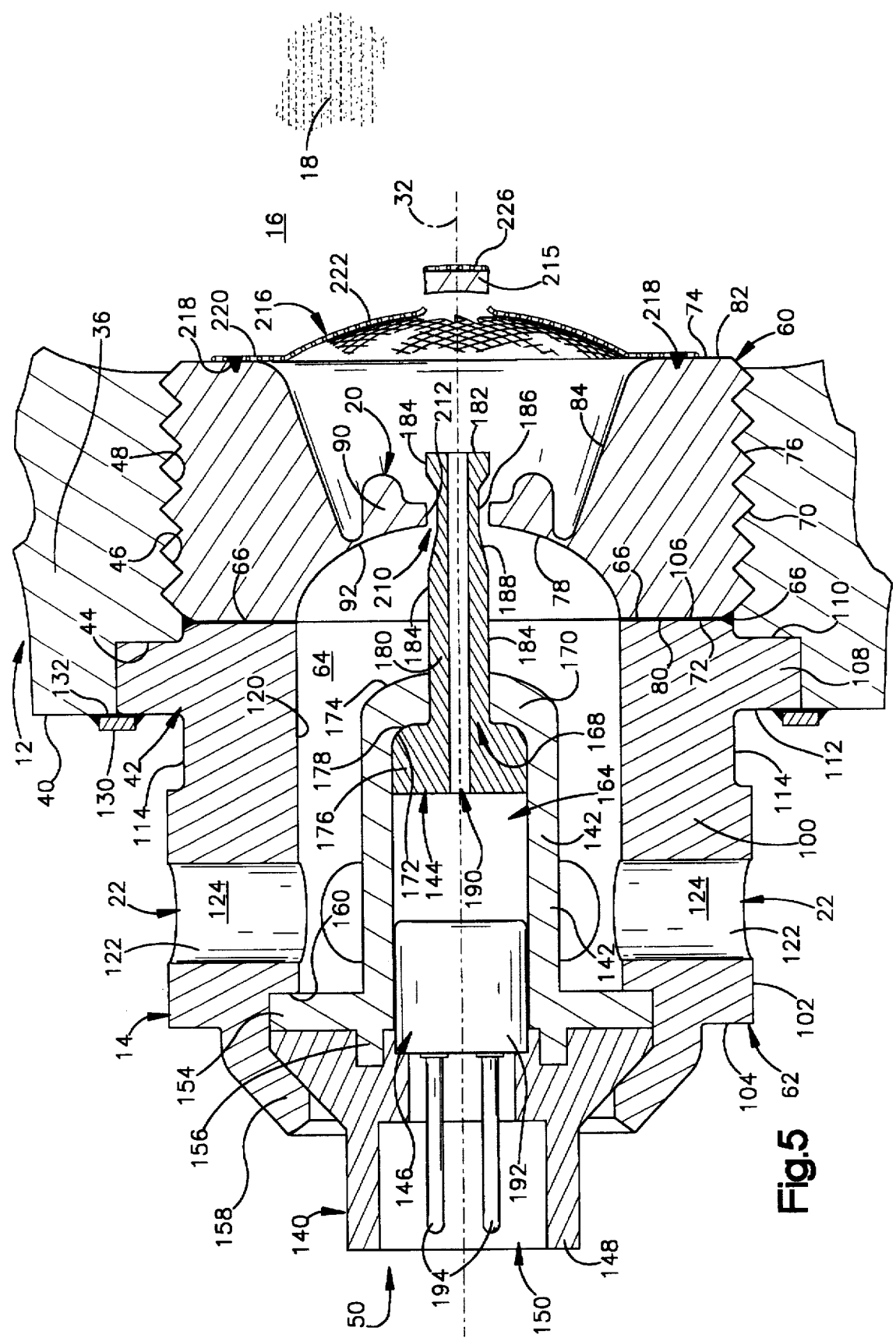
FIG. 5 is a view similar to FIG. 2 showing the pressure vessel in a partially opened condition.

The combustion products spewed from the casing 192 develop a thrust which propels the probe 144 along the axis 32 from left to right, as viewed in the drawings. As the probe 144 approaches the position in which it is shown in FIG. 5, the shaft 180 of the probe 144 moves forcefully against and through the closure wall 20 so as to puncture an opening 210 through the center of the closure wall 20. As the probe 144 reaches the position of FIG. 5, the convex surface 178 of the probe 144 moves into abutting engagement with the concave surface 172 of the cylinder 142. The cylinder 142 thus functions as a stop member which stops the probe 144 in an actuated position in which the shaft 180 projects axially through the opening 210 in the closure wall 20.

The opening 210 in the closure wall 20 is a first outlet orifice through which the mixture of gases 18 begins to exit the storage chamber 16. The opening 210 has a circular shape defined by an annular inner edge surface 212 of the closure wall 20. The inner edge surface 212, and hence the opening 210, has a diameter which is substantially equal to the diameter of the peripheral surface 184 of the shaft 180 adjacent to the end surface 182 of the shaft 180. However, the reduced diameter portion 186 of the peripheral surface 184 extends through the opening 210 when the probe 144 is in the actuated position of FIG. 5. That portion 186 of the peripheral surface 184 is spaced radially from the inner edge surface 212 of the closure wall 20 so that the mixture of gases 18 can flow outward through the opening 210 between those surfaces.

Figure 6:
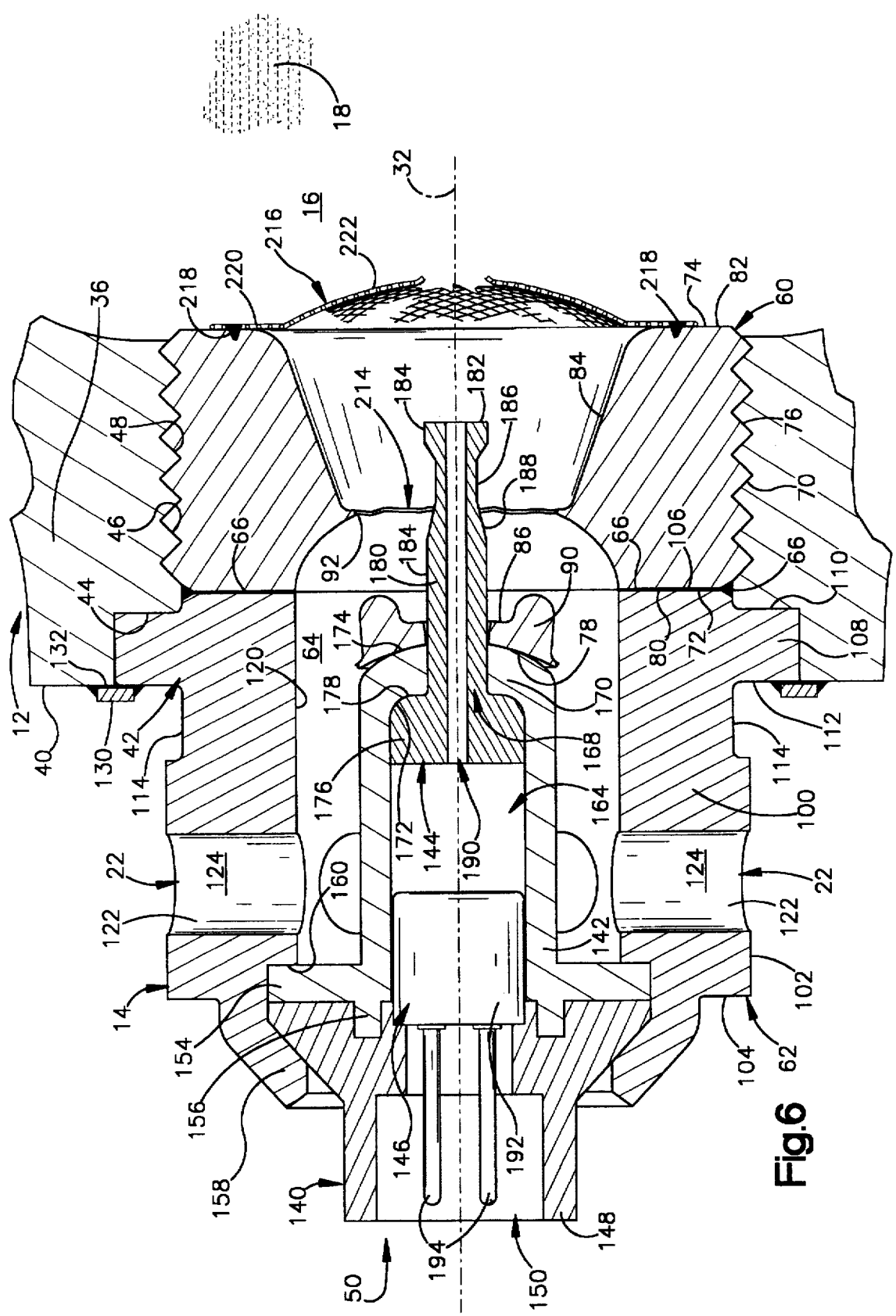
FIG. 6 is a view similar to FIGS. 2 and 5 showing the pressure vessel in a fully opened condition.

The probe 144 conveys combustion products through the passage 190 from the first bore 162 to the storage chamber 16. Those combustion products ignite the combustible mixture of gases 18 in the storage chamber 16. This causes the fluid pressure in the storage chamber 16 to increase to the predetermined elevated level at which it ruptures the peripheral portion 92 of the closure wall 20. The breakaway portion 90 of the closure wall 20 is thus severed from the peripheral portion 92, as shown in FIG. 6, and is moved axially outward from the peripheral portion 92 into the conduit 64. A second, larger outlet orifice 214 is formed radially inward of the ruptured peripheral portion 92 of the closure wall 20. The mixture of gases 18 exits the storage chamber 16 through the second outlet orifice 214 at elevated flow rates corresponding to the elevated fluid pressure levels that are attained upon combustion in the storage chamber 16.

When the breakaway part 90 of the closure wall 20 is severed and moved away from the peripheral portion 92 in the foregoing manner, the probe 144 guides the breakaway part 90 to move axially to the position in which it is shown in FIG. 6. Specifically, the probe 144 is in the actuated position of FIG. 5 when the breakaway part 90 becomes severed from the peripheral portion 92. The shaft 180 of the probe 144 is then located in a position in which it engages and guides the breakaway part 90 to slide telescopically over the shaft 180 toward the end wall 170 of the cylinder 142. The tapered surface portion 188 of the shaft 180 guides the annular inner edge surface 212 of the breakaway part 90 to move telescopically onto the cylindrical surface portion 184 of the shaft 180 in a direction extending from right to left, as viewed in the drawings. The surface 212 then slides along the surface 184 as the breakaway part 90 moves axially toward the end wall 170. When the breakaway part 90 reaches the end wall 170, the concave surface 78 on the breakaway part 90 moves into abutting contact with the convex surface 174 on the end wall 170. The breakaway part 90 is thereafter held against the end wall 170 by the pressure of the gases 18 flowing outward through the conduit 64. In this manner, the probe 144 and the cylinder 142 function together to capture the breakaway part 90 at a predetermined location in the conduit 64 so that the breakaway part 90 cannot obstruct the flow of gases 18 moving outward through the conduit 64.

As further shown in FIG. 5, the probe 144 severs a small piece 215 of the closure wall 20 upon puncturing the opening 210 through the closure wall 20. A screen 216 is provided to block the severed piece 215 from moving outward through the second outlet orifice 214 with the mixture of gases 18. The screen 216 also is preferably formed of steel, and is most preferably formed of Type 304L or Type 316L stainless steel.

A plurality of spot welds 218 fix a peripheral portion 220 of the screen 216 to the inner end surface 74 of the first plug part 60 at the peripheral portion 82 of the inner end surface 74. A central portion 222 of the screen 216 extends diametrically across the intermediate and central portions 84 and 86 of the inner end surface 74. In this arrangement, the screen 216 extends fully across the path taken by the mixture of gases 18 flowing outward from the storage chamber 16 through the first plug part 60. The severed piece 215 of the closure wall 20 is propelled forcefully into the storage chamber 16 along the axis 32 such that it, in turn, punctures the screen 216 and severs a small piece 226 of the screen 216. The screen 216 subsequently blocks both of the severed pieces 215 and 226 from moving outward through the second outlet orifice 214 with the mixture of gases 18.

Although the screen 216 is included in the first embodiment of the present invention to block the severed piece 215 of the closure wall 20 from moving outward into the conduit 64, such a screen may also be included in alternative embodiments of the present invention in which a projectile, rather than a probe, severs a piece of a corresponding closure wall. Such a projectile is disclosed, for example, in U.S. Pat. No. 5,464,247, assigned to TRW Vehicle Safety Systems Inc. A screen constructed in accordance with the present invention could block both the projectile and the severed piece of the closure wall from moving outward into the corresponding conduit.

Figure 7:
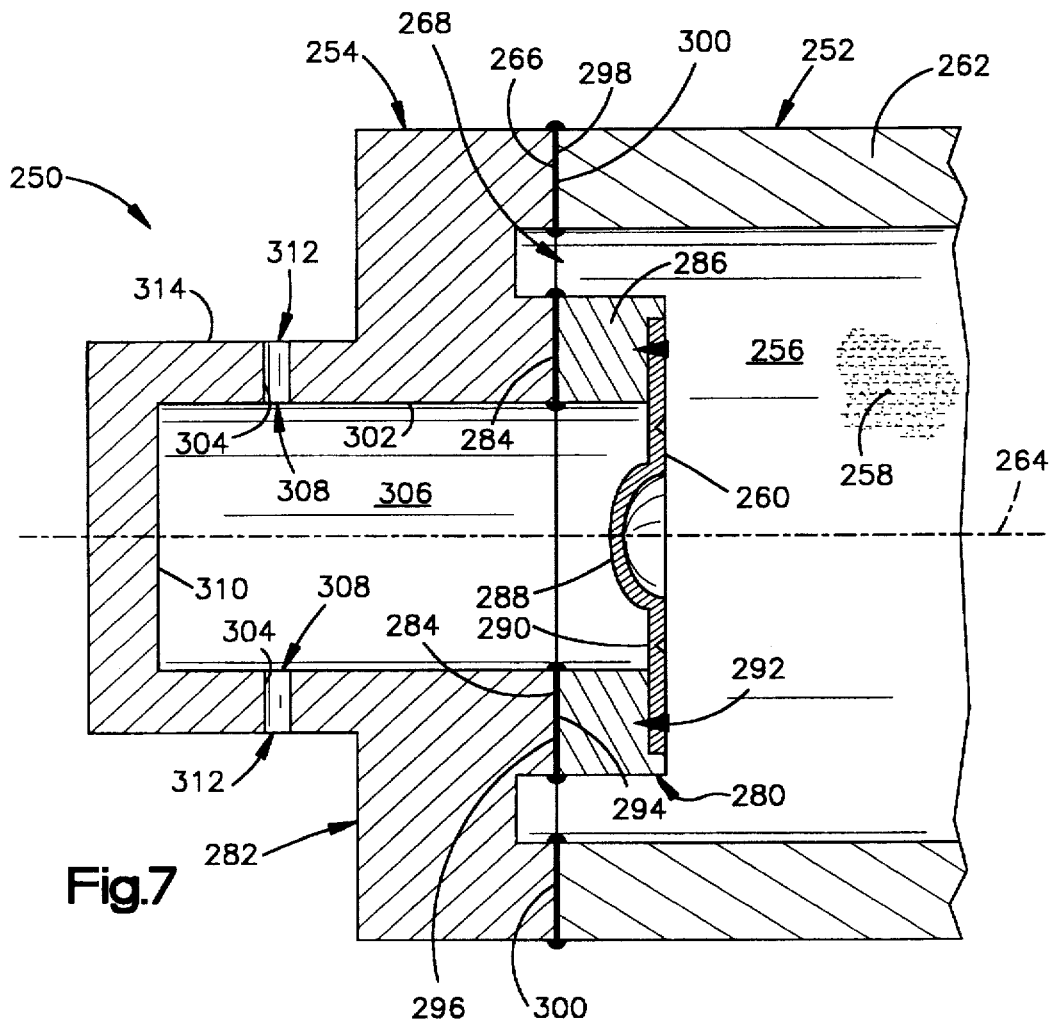
FIG. 7 is a schematic, partial view of a pressure vessel comprising a second embodiment of the present invention.
Figure 8:
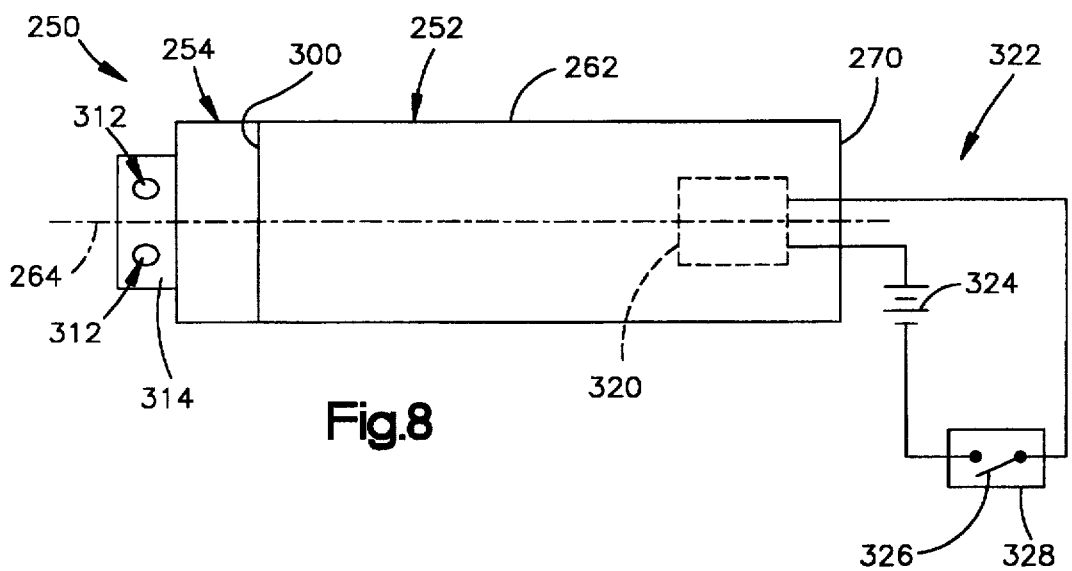
FIG. 8 is a schematic view showing the pressure vessel of FIG. 7 with an electric circuit including a part of the pressure vessel.

A pressure vessel 250 comprising a second embodiment of the present invention is shown in the schematic views of FIGS. 7 and 8. The pressure vessel 250 includes a tank 252 and a closure structure 254. Like the tank 12 described above, the tank 252 may be referred to as a bottle, and has a storage chamber 256 containing fluid 258 under pressure. Like the closure structure 14 described above, the closure structure 254 closes the corresponding tank 252, and has a rupturable closure wall 260. However, unlike the closure structure 14, the closure structure 254 is shaped as a cap rather than a plug.

The tank 252 has a cylindrical body wall 262 with a longitudinal central axis 264. An annular outer edge surface 266 of the body wall 262 defines a circular open end 268 of the tank 252. The body wall 262 has a constant diameter, and extends along the entire length of the tank 252 between a circular end wall 270 (FIG. 8) and the open end 268. The tank 252 is preferably formed of a material comprised at least substantially of aluminum, with 6061 Alloy being most preferable.

The closure cap 254 includes first and second cap parts 280 and 282. A friction weld 284, which is preferably an inertia weld, fixes and seals the two cap parts 280 and 282 to each other. The first cap part 280 is defined by interconnected pieces of steel; namely, the closure wall 260 and a support ring 286. As an example of a closure wall that can be used in accordance with the present invention, the closure wall 260 is a burst disk with a central breakaway portion 288 defined by a surrounding rupturable portion 290. Such a burst disk is known in the art. A circumferentially extending weld 292 fixes and seals the burst disk 260 and the support ring 288 concentrically together. Preferred materials for the burst disk 260 and the support ring 286 include Type 304L and Type 316L stainless steel.

The cap part 282 is preferably constructed as a single continuous body of material comprised at least substantially of aluminum, with 6061 Alloy being most preferable. A first annular inner end surface 294 of the second cap part 282 is centered on the axis 264, and abuts a coextensive annular outer end surface 296 of the support ring 286. The inertia weld 284 joins the inner end surface 294 to the outer end surface 296.

When the first and second cap parts 280 and 282 have been interconnected by the inertia weld 284, the closure cap 254 is mounted on the body wall 262 of the tank 252 to close the open end 268 of the tank 262. Specifically, a second annular inner end surface 298 of the second cap part 282 is moved into abutment with the annular outer end surface 266 of the body wall 262. Another friction weld 300, which also is preferably an inertia weld, is then formed to join the abutting surfaces 298 and 266 together. The closure cap 254 and the tank 252 are thus fixed and sealed to each other circumferentially entirely around the axis 264.

The second cap part 282 further has a major cylindrical inner surface 302 and a plurality of minor cylindrical inner surfaces 304. The cylindrical inner surfaces 302 and 304 respectively define an outlet conduit 306 and a plurality of outlet passages 308. The conduit 306 extends axially from the annular surface 294 to a circular inner surface 310. The passages 308 extend radially from the conduit 306 to a plurality of outlet openings 312 at a cylindrical outer surface 314. The second cap part 282 is preferably anodized at the inner surfaces 302, 304 and 310, and may also be anodized at portions of the outer surface 314 which surround the outlet openings 312.

The fluid 258 contained under pressure in the storage chamber 256 preferably comprises combustible fluid like the combustible fluid 18 described above with reference to the first embodiment of the present invention. The closure cap 254 may also have a known inlet structure (not shown) for filling the tank 252 with the fluid 258. When the tank 252 has been filled with the fluid 258, the fluid pressure in the storage chamber 256 acts axially outward against the closure cap 254, i.e., in a direction extending from right to left in FIG. 7. This induces stress in the inertia welds 284 and 300. The stress induced in the inertia weld 300 consists essentially of tensile and shear stress. The similar materials (aluminum or aluminum alloys) of the tank 252 and the second cap part 282 help to ensure that the inertia weld 300 will be strong enough to withstand such stress. On the other hand, the stress induced in the inertia weld 284 consists essentially of compressive stress. The first and second cap parts 280 and 282 are securely fixed and sealed to each other by the inertia weld 284 in this condition.

As shown schematically in FIG. 8, the pressure vessel 250 further includes an igniter 320 for igniting the fluid 258 in the storage chamber 256. The igniter 320 may have any suitable structure known in the art, and is included in an electrical circuit 322 with a power source 324 and a normally open switch 326. As in the electrical circuit 152 described above, the power source 324 in the electrical circuit 322 preferably is the vehicle battery and/or a capacitor. The switch 326 is part of a collision sensor 328 which operates in the manner described above with reference to the collision sensor 204. Accordingly, the igniter 320 is actuated so as to ignite the fluid 258 upon the occurrence of a vehicle collision having at least a predetermined threshold level of severity. The pressure vessel 250 is opened when the heat generated by combustion of the fluid 258 causes the fluid pressure in the storage chamber 256 to sever the breakaway part 288 from the closure wall 260.

The present invention has been described with reference to preferred embodiments. From the foregoing description of the invention, those skilled in the art will perceive improvements, changes and modifications. For example, the closure structure 14 in the first embodiment is a plug which closes an open end of a tank with a tapered neck, and the closure structure 254 in the second embodiment is a cap which closes an open end of a tank with a constant diameter. However, a tank for containing fluid under pressure may have an outlet portion with a different configuration and/or location. A closure structure for closing such a tank in accordance with the present invention may have a configuration and/or location which is correspondingly different from those described above. Such improvement, changes and modifications within the skill of the art are intended to be covered by the appended claims.

Having described the invention, the following is claimed:

1. Apparatus comprising:
a tank closure having first and second parts which are friction welded to each other, said first part of said tank closure being formed of steel and including a rupturable closure wall, said second part of said tank closure being formed of material comprised at least substantially of aluminum and defining a fluid flow conduit communicating said rupturable closure wall with an outlet opening.

2. Apparatus as defined in claim 1 wherein said first and second parts of said tank closure are inertia welded to each other.

3. Apparatus as defined in claim 1 wherein said first part of said tank closure is a single continuous body of steel.

4. Apparatus as defined in claim 1 wherein said first part of said tank closure has an external screw thread centered on an axis, said first part of said tank closure further having an axially outer end surface with a concave central portion and an annular peripheral portion, said peripheral portion of said outer end surface bounding said central portion and extending radially outward from said central portion to said external screw thread in a plane perpendicular to said axis.

5. Apparatus as defined in claim 4 wherein said second part of said tank closure has an axially inner end surface abutting said axially outer end surface at said peripheral portion of said axially outer end surface, said first and second parts of said tank closure being fixed and sealed to each other by a friction weld at said abutting surfaces.

6. Apparatus as defined in claim 5 wherein said friction weld is an inertia weld.

7. Apparatus as defined in claim 1 further comprising a tank having an outlet portion with an internal screw thread, said first part of said tank closure having an external screw thread engaged with said internal screw thread.

8. Apparatus as defined in claim 7 wherein said second part of said tank closure is free of an external screw thread engaged with said internal screw thread, said second part of said tank closure having a plurality of planar outer surface portions defining a corresponding plurality of wrench flats.

9. Apparatus as defined in claim 1 further comprising a screen formed of steel, said screen being welded to said first part of said tank closure and extending across an inner side of said rupturable closure wall.

10. Apparatus as defined in claim 9 wherein said screen and said first part of said tank closure are formed of stainless steel.

11. Apparatus as defined in claim 1 wherein said first part of said tank closure is defined by interconnected pieces of steel, said pieces including a steel disk which defines said rupturable closure wall.

12. Apparatus as defined in claim 11 wherein said pieces further include a steel support ring which adjoins said second part of said tank closure, said steel disk being welded to said support ring in a position concentric with said support ring.

13. Apparatus as defined in claim 1 wherein said second part of said tank closure is a single continuous body of said material forming said second part.

14. Apparatus as defined in claim 1 further comprising a tank and a connector part, said tank having an outlet portion formed of material comprised at least substantially of aluminum, said connector part being formed of material comprised at least substantially of aluminum and being friction welded to said second part of said tank closure and to said outlet portion of said tank.

15. Apparatus as defined in claim 14 wherein said connector part is inertia welded to said second part of said tank closure.

16. Apparatus as defined in claim 14 wherein said connector part is a ring extending circumferentially around said second part of said tank closure.

17. Apparatus as defined in claim 1 further comprising a tank having an outlet portion formed of material comprised at least substantially of aluminum, said second part of said tank closure and said outlet portion of said tank having abutting annular surfaces which are joined to each other by a friction weld.

18. Apparatus as defined in claim 17 wherein said friction weld is an inertia weld.

19. Apparatus as defined in claim 1 further comprising a tank containing combustible fluid, said tank closure being engaged with an outlet portion of said tank so as to close said tank, said second part of said tank closure having an anodized inner surface defining said conduit.

20. Apparatus as defined in claim 19 further comprising an initiator assembly which, when actuated, ignites said combustible fluid, said second part of said tank closure being crimped against said initiator assembly.

21. Apparatus comprising:
a tank containing fluid under pressure, said tank having an outlet portion formed of material comprised at least substantially of aluminum;
a first closure part formed of steel, said first closure part including a rupturable closure wall blocking said fluid from exiting said tank through said outlet portion of said tank;
a second closure part formed of material comprised at least substantially of aluminum, said second closure part defining a fluid flow conduit communicating said closure wall with an outlet opening;
a first friction weld which fixes and seals said first closure part to said second closure part; and
a second friction weld which fixes and seals said second closure part to said outlet portion of said tank;
said tank and said closure parts being arranged relative to each other such that said pressure induces stress in said first friction weld which consists essentially of compressive stress, said pressure further inducing stress in said second friction weld which consists essentially of tensile and shear stress.

22. Apparatus as defined in claim 21 wherein each of said friction welds is an inertia weld.

23. Apparatus as defined in claim 21 further comprising a connector part which is welded to said second plug part and to said outlet portion of said tank by said second friction weld, said connector part being formed of material comprised at least substantially of aluminum.

24. Apparatus as defined in claim 23 wherein each of said friction welds is an inertia weld.

25. Apparatus as defined in claim 21 wherein said second closure part and said outlet portion of said tank have abutting annular surfaces which are joined to each other by said second friction weld.

26. Apparatus as defined in claim 25 wherein each of said friction welds is an inertia weld.

27. Apparatus as defined in claim 21 wherein said fluid comprises combustible fluid, said second closure part having an anodized inner surface defining said conduit.

28. Apparatus as defined in claim 21 wherein said fluid comprises combustible fluid, said apparatus further comprising an initiator assembly which, when actuated, ignites said combustible fluid, said second closure part being crimped against said initiator assembly.

29. Apparatus as defined in claim 21 further comprising a screen formed of steel, said screen being welded to said first closure part and extending across an inner side of said closure wall.

30. Apparatus as defined in claim 29 wherein said screen and said first closure part are formed of stainless steel.

31. Apparatus as defined in claim 21 wherein said outlet portion of said tank has an internal screw thread, said first closure part having an external screw thread engaged with said internal screw thread.

32. Apparatus as defined in claim 31 wherein said second closure part is free of an external screw thread engaged with said internal screw thread.

33. Apparatus as defined in claim 31 wherein said internal and external screw threads are centered on an axis, said first closure part having an axially outer end surface with a concave central portion and an annular peripheral portion, said peripheral portion of said outer end surface bounding said central portion and extending radially outward from said central portion to said external screw thread in a plane perpendicular to said axis.

34. Apparatus as defined in claim 33 wherein said second closure part has an axially inner end surface abutting said outer end surface of said first plug part at said peripheral portion of said outer end surface, said first friction weld joining said abutting surfaces to each other.

35. Apparatus as defined in claim 34 wherein each of said friction welds is an inertia weld.

36. Apparatus as defined in claim 21 wherein said first closure part is a single continuous body of steel.

37. Apparatus as defined in claim 21 wherein said first closure part is defined by interconnected pieces of steel, said pieces including a steel disk which defines said rupturable closure wall.

38. Apparatus as defined in claim 37 wherein said pieces further include a steel support ring which adjoins said second closure part, said steel disk being welded to said support ring in a position concentric with said support ring.

* * * * *